(12) United States Patent
Thiagarajan et al.

(10) Patent No.: US 8,945,699 B2
(45) Date of Patent: Feb. 3, 2015

(54) SHEET, AN ARTICLE, AND A METHOD OF MAKING A SHEET

(75) Inventors: Chinniah Thiagarajan, Karnataka (IN); Frans Adriaansen, Bergen Op Zoom (NL)

(73) Assignee: Sabic Global Technologies B.V. (NL)

( * ) Notice: Subject to any disclaimer, the term of this patent is extended or adjusted under 35 U.S.C. 154(b) by 1577 days.

(21) Appl. No.: 12/263,719

(22) Filed: Nov. 3, 2008

(65) Prior Publication Data

US 2010/0112289 A1 May 6, 2010

(51) Int. Cl.
| | |
|---|---|
| *B32B 3/00* | (2006.01) |
| *B32B 7/00* | (2006.01) |
| *E06B 3/00* | (2006.01) |
| *E06B 3/26* | (2006.01) |
| *E04C 2/20* | (2006.01) |
| *B29C 47/00* | (2006.01) |
| *E04C 2/32* | (2006.01) |
| *E04D 3/28* | (2006.01) |
| *B29C 47/02* | (2006.01) |
| *B29C 47/90* | (2006.01) |

(52) U.S. Cl.
CPC ............... *E04C 2/20* (2013.01); *B29C 47/0038* (2013.01); *E04C 2/324* (2013.01); *E04D 3/28* (2013.01); *B29C 47/0021* (2013.01); *B29C 47/02* (2013.01); *B29C 47/903* (2013.01)
USPC ............. 428/119; 428/156; 428/212; 52/202; 52/204.5; 52/630; 52/789.1

(58) Field of Classification Search
USPC ................. 428/100, 120, 156, 212; 52/590.1, 52/789.1, 202, 204.5, 630
See application file for complete search history.

(56) References Cited

U.S. PATENT DOCUMENTS

| | | | | |
|---|---|---|---|---|
| 1,278,270 | A | * | 9/1918 | Wilber .......................... 428/139 |
| 2,999,835 | A | | 9/1961 | Goldberg |
| 3,153,008 | A | | 10/1964 | Fox |
| 3,334,154 | A | | 8/1967 | Kim |
| 3,528,196 | A | * | 9/1970 | Luke ................... 49/62 |
| 4,001,184 | A | | 1/1977 | Scott |
| 4,123,436 | A | | 10/1978 | Holub et al. |
| 4,131,575 | A | | 12/1978 | Adelmann et al. |
| 4,351,920 | A | | 9/1982 | Ariga et al. |
| 4,799,346 | A | | 1/1989 | Bolton et al. |
| 4,946,527 | A | * | 8/1990 | Battrell .......................... 156/60 |
| 5,960,606 | A | | 10/1999 | Dlubak |
| 6,190,165 | B1 | * | 2/2001 | Andreiko et al. ................. 433/9 |
| 7,138,166 | B2 | | 11/2006 | Rinehart et al. |
| 7,334,371 | B2 | | 2/2008 | Rinehart et al. |

FOREIGN PATENT DOCUMENTS

EP    1507047 A1    2/2005

* cited by examiner

*Primary Examiner* — Donald J Loney
(74) *Attorney, Agent, or Firm* — Cantor Colburn LLP

(57) ABSTRACT

Disclosed is a sheet that comprises protrusions comprising a first portion extending from a base by a second portion where a second portion diameter is less than a first portion diameter. Also disclosed is a sheet that comprises a first portion and a second portion extending from a symmetry plane, where the protrusions repeat across a length of the sheet along the symmetry plane where the first portion has a first portion diameter and the second portion has a second portion diameter and where the second portion diameter is less than the first portion diameter. A sheet comprising a plurality of cavities across a width of the sheet where each cavity extends the length of the sheet and the cavity has an opening diameter that is smaller than a body diameter is also disclosed.

17 Claims, 4 Drawing Sheets

SHEET, AN ARTICLE, AND A METHOD OF MAKING A SHEET

BACKGROUND

Thin, transparent polymeric sheets (e.g., a polycarbonate sheet with a thickness of about 1-3 mm) have similar light transmission values to that of glass. However, the lack of stiffness of a flat thin sheet reduces its overall practical use in applications subjected to a wind load stress since a thin sheet does not withstand an expected wind load.

Increased wind loading, such as hurricane force winds, poses a problem with regard to sheet structures. For large load carrying capacity, sheets are designed to be stiff. However, this adds to the weight of the structure and if the external load exceeds the weight of the sheet structure, then the sheet structure might fail. Additionally, failsafe and damage tolerance design methods are limited due to limitations in the material performance. Hence, new stress stiffening methods are needed, which do not add to the weight of the structure, but that do provide increased structural support to the structure.

SUMMARY

Disclosed herein is a sheet that comprises protrusions comprising a first portion extending from a base by a second portion. A second portion diameter is less than a first portion diameter.

Also disclosed is a sheet that comprises a first portion and a second portion extending from a symmetry plane, where the protrusions repeat across a length of the sheet along the symmetry plane. The first portion has a first portion diameter and the second portion has a second portion diameter. The second portion diameter is less than the first portion diameter.

Also disclosed is a sheet that comprises a plurality of cavities across a width of the sheet. Each cavity extends the length of the sheet and the cavity has an opening diameter that is smaller than a body diameter.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
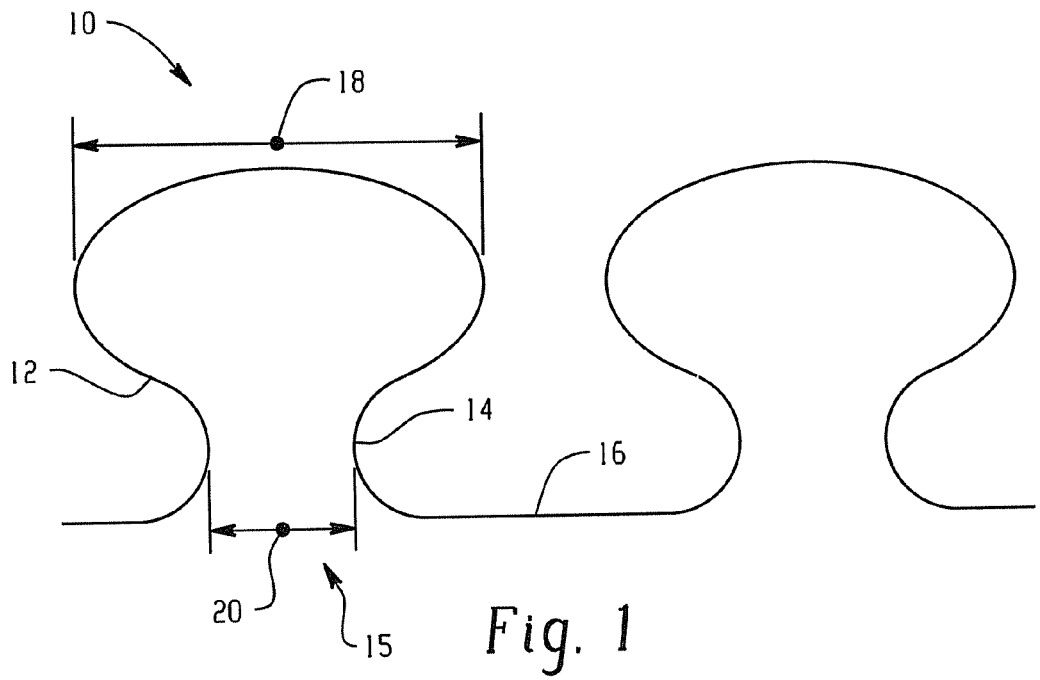
FIG. 1 is a front profile view of an embodiment of the protrusions.

Disclosed herein are sheets and methods of making the same. In one embodiment, the sheet comprises a surface(s). The surface(s) comprises protrusions. The protrusions act as structural support members when stress (e.g., air or wind) is applied to the sheet. The protrusions assist in decreasing the amount of deflection of the sheet when high stress (e.g., hurricane force wind) is applied. Not to be limited by theory, the protrusions can have a larger diameter portion attached to a base (e.g., a sheet) by a smaller diameter portion, which when placed under stress, increase the stiffness of the sheet. The protrusion can comprise a pattern that can be repeated across the width of the sheet.

In the sheets disclosed herein, the external load (e.g., wind; in extreme cases, hurricane force wind) is used as a structural reinforcing member. The external load causes a minor decrease (e.g., less than or equal to 10%) in the diameter of the larger diameter portion, while simultaneously causing a minor increase in the diameter of the smaller diameter portion. The protrusions remain substantially the same shape as the external load is applied. However, the protrusions become stiff and act as a structural reinforcing member as the load is applied. This allows greater loads to be handled by the same thickness of material sheets and/or for the same load to be handled by thinner sheets or sheets of a different material. The sheet is less stiff (i.e., less structural support members are present in the overall sheet), with the protrusions becoming stiffer as the external load is applied. Essentially, due to the design of the protrusions, the stress is applied more evenly about the protrusion, without substantially changing the shape of the protrusion.

In one embodiment a sheet comprises protrusions comprising a first portion extending from a base by a second portion. The second portion comprises a second portion diameter that is less than a first portion diameter.

In another embodiment a sheet comprises protrusions comprising a first portion and a second portion extending from a symmetry plane, where the protrusions repeat across a length of the sheet along the symmetry plane. The first portion comprises a first portion diameter and the second portion comprises a second portion diameter. The second portion diameter is less than the first portion diameter.

In another embodiment, a method of making a sheet comprises extruding a sheet comprising a surface and disposing protrusions on the surface where the protrusions comprise a first portion connected to a base by a second portion. The second portion comprises a second portion diameter that is less than a first portion diameter.

The embodiments can further comprise where the second portion diameter is less than or equal to 90% of the first portion diameter, specifically less than or equal to 80% of the first portion diameter, more specifically less than or equal to 70% of the first portion diameter. The embodiments can also further comprise wherein the second portion diameter is 25% to 75% of the first portion diameter, specifically 25% to 55% of the first portion diameter. The embodiments can also comprise where the change in diameter of the first diameter portion of a stressed protrusion is less than or equal to 10% of the first portion diameter of a non-stressed protrusion, more specifically less than equal to 5% of the first portion diameter of a non-stressed protrusion. The embodiments can also comprise where the sheet comprises polycarbonate. The embodiments can further comprise an article, where the article is selected from the group consisting of a storm panel, roofing, or a wall panel. The embodiments can also comprise a sheet further comprising a unit cell comprising a periodic symmetry plane, where the unit cell repeats across a length of the sheet along a periodic symmetry plane.

The embodiments can also further comprise the sheet having a mid-sheet deflection of less than or equal to 35 mm at a thickness of 1.8 mm, length of 1890 mm, and width of 1444 mm, specifically less than or equal to 30 mm. The embodiments can also comprise the sheet having a mid-sheet deflection of less than or equal to 45 mm at a thickness of 1.3 mm, length of 1890 mm, and width of 1444 mm specifically less than or equal to 40 mm. The embodiments can further comprise the sheet having stiffness greater than or equal to 70,000 N/m at a thickness of 1.8 mm, length of 1890 mm, and width of 1444 mm specifically greater than or equal to 85,000 N/m. The embodiments can still further comprise the sheet having a stiffness of greater than or equal to 62,000 N/m at a thickness of 1.3 mm, length of 1890 mm, and width of 1444 mm, specifically greater than or equal to 69,000 N/m.

The sheets disclosed herein can comprise any material capable of providing the desired flexibility and optionally greater distribution of stress, e.g., thermoplastic(s), thermoset(s), composite(s), metallic(s) and combinations comprising at least one of the foregoing. Exemplary thermoplastics include polyalkylenes (e.g., polyethylene, polypropylene, polyalkylene terephthalates (such as polyethylene terephthalate, polybutylene terephthalate)), polycarbonates, acrylics, polyacetals, styrenes (e.g., impact-modified polystyrene, acrylonitrile-butadiene-styrene, styrene-acrylonitrile), poly (meth)acrylates (e.g., polybutyl acrylate, polymethyl methacrylate), polyetherimide, polyurethanes, polyphenylene sulfides, polyvinyl chlorides, polysulfones, polyetherketones, polyether etherketones, polyether ketone ketones, polyamides, olefins, and so forth, as well as combinations comprising at least one of the foregoing. Exemplary thermoplastic blends comprise acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyethylene/nylon, polyethylene/polyacetal, and the like, as well as combinations comprising at least one of the foregoing. Exemplary thermoplastic copolymers comprise poly(ethylene terephthalate copolymers (APET, PETG), cyclic olefin copolymers, acrylic olefin copolymers, and so forth, as well as combinations comprising at least one of the foregoing.

In one embodiment, a polycarbonate material is employed, such as those designated by the trade name Lexan®, which are commercially available from SABIC Innovative Plastics. Thermoplastic polycarbonate resin that can be employed in producing the plastic sheet includes, without limitation, aromatic polycarbonates, copolymers of an aromatic polycarbonate such as polyester carbonate copolymer, blends thereof, and blends thereof with other polymers depending on the end use application. In another embodiment, the thermoplastic polycarbonate resin is an aromatic homo-polycarbonate resin such as the polycarbonate resins described in U.S. Pat. No. 4,351,920 to Ariga et al.

For example, some possible polycarbonates can be prepared by reacting a dihedral phenol with a carbonate precursor, such as phosgene, a haloformate, or a carbonate ester. Generally, such carbonate polymers comprise recurring structural units of the Formula (I)

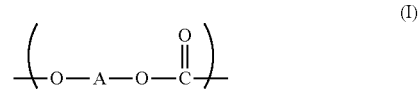

wherein A is a divalent aromatic radical of the dihydric phenol employed in the polymer producing reaction. In one embodiment, the polycarbonate can have an intrinsic viscosity (as measured in methylene chloride at 25° C.) of about 0.30 to about 1.00 deciliter/gram (dL/g). The dihydric phenols employed to provide such polycarbonates can be mononuclear or polynuclear aromatic compounds, containing as functional groups two hydroxy radicals, each of which is attached directly to a carbon atom of an aromatic nucleus. Possible dihydric phenols include, for example, 2,2-bis(4-hydroxyphenyl)propane (bisphenol A), hydroquinone, resorcinol, 2,2-bis(4-hydroxyphenyl)pentane, 2,4'-(dihydroxydiphenyl)methane, bis(2-hydroxyphenyl)methane, bis(4-hydroxyphenyl)methane, bis(4-hydroxy-5-nitrophenyl) methane, 1,1-bis(4-hydroxyphenyl)ethane, 3,3-bis(4-hydroxyphenyl)pentane, 2,2-dihydroxydiphenyl, 2,6-dihydroxynaphthalene, bis(4-hydroxydiphenyl)sulfone, bis (3,5-diethyl-4-hydroxyphenyl)sulfone, 2,2-bis(3,5-dimethyl-4-hydroxyphenyl)propane, 2,4'-dihydroxydiphenyl sulfone, 5'-chloro-2,4'-dihydroxydiphenyl sulfone, bis(4-hydroxyphenyl)diphenyl sulfone, 4,4'-dihydroxydiphenyl ether, 4,4'-dihydroxy-3,3'-dichlorodiphenyl ether, 4,4-dihydroxy-2,5-dihydroxydiphenyl ether, and the like, and mixtures thereof. Other possible dihydric phenols for use in the preparation of polycarbonate resins are described, for example, in U.S. Pat. No. 2,999,835 to Goldberg, U.S. Pat. No. 3,334,154 to Kim, and U.S. Pat. No. 4,131,575 to Adelmann et al.

The polycarbonate resins can be manufactured by known processes, such as, for example and as mentioned above, by reacting a dihydric phenol with a carbonate precursor, such as phosgene, a haloformate, or a carbonate ester, in accordance with methods set forth in the above-cited literature and in U.S. Pat. No. 4,123,436 to Holub et al., or by transesterification processes such as are disclosed in U.S. Pat. No. 3,153,008 to Fox, as well as other processes.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired. Branched polycarbonates are also useful, such as are described in U.S. Pat. No. 4,001,184 to Scott. Also, there can be utilized combinations of linear polycarbonate and a branched polycarbonate. Moreover, combinations of any of the above materials can be employed to provide the polycarbonate resin.

The polycarbonates can be branched or linear and generally will have a weight average molecular weight (Mw) of 10,000 to 200,000 atomic mass units (AMU), specifically 20,000 to 100,000 AMU as measured by gel permeation chromatography. The polycarbonates disclosed herein can employ a variety of end groups to improve performance, such as bulky mono phenols, including cumyl phenol.

Additives can be employed to modify the performance, properties, or processing of the polymeric material. Exemplary additives comprise antioxidants, such as, organophosphites, for example, tris(nonyl-phenyl)phosphite, tris(2,4-di-t-butylphenyl)phosphite, bis(2,4-di-t-butylphenyl)

pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, fibers, glass fibers (including continuous and chopped fibers), mica and other additives; such as, for example, mold release agents, UV absorbers, stabilizers such as light stabilizers and others, lubricants, plasticizers, pigments, dyes, colorants, anti-static agents, blowing agents, flame retardants, and impact modifiers, among others.

A coating(s) can be disposed on any of the sheet's surfaces to improve the sheet's properties if the coating does not decrease the strength or light transmission of the panel such that the panel is non-operative. Exemplary coatings can comprise antifungal coatings, hydrophobic coatings, hydrophilic coatings, light dispersion coatings, anti-condensation coatings, scratch resistant coatings, and the like, as well as combinations comprising at least one of the foregoing. In one embodiment, the polycarbonate sheet can be coated with a silicone or acrylate hardcoat providing abrasion resistance and solvent resistance to the sheet.

Additives can be employed to modify the performance, properties, or processing of the plastic material. Exemplary additives comprise antioxidants, such as, organophosphites, for example, tris(nonyl-phenyl)phosphite, tris(2,4-di-t-butylphenyl)phosphite, bis(2,4-di-t-butylphenyl)pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, fibers, glass fibers (including continuous and chopped fibers), mica and other additives; such as, for example, mold release agents, UV absorbers, stabilizers such as light stabilizers and others, lubricants, plasticizers, pigments, dyes, colorants, anti-static agents, blowing agents, flame retardants, and impact modifiers, among others.

The specific thickness of the plastic sheet(s) is dependent upon the particular use of the sheet, e.g., the degree of structural integrity that is desired from the plastic sheet(s), as well as the particular composition of each of the plastic sheet(s). In some embodiments, the plastic sheet(s) can have a thickness of about 0.10 millimeter (mm) to about 32 mm or, more specifically, about 0.5 mm to about 15 mm or, even more specifically, about 1.0 mm to about 12 mm, and still more specifically about 1.0 mm to about 6.0 mm. As with the thickness of the plastic sheet(s), the specific length and width of the sheet is also dependent upon the particular use of the sheet. In some embodiments, the plastic sheet(s) can have a length of 2438 mm and a width of 2032 mm, specifically a length of 2438 mm and a width of 1829 mm, more specifically a length of 1890 mm and a width of 1444 mm, still more specifically a length of 1524 mm and a width of 1219 mm, and yet more specifically a length of 1524 mm and width of 991 mm.

Hurricane force winds are an extreme stress (i.e., wind load) for any structural glazing design (i.e., sheet). In one embodiment, the wind load itself is used as a stiffening member to increase the performance of the structure. The design of the structure functions to use the wind exerted, thereby also increasing the load carrying capacity. The performance of the structure increases with increased loading.

Figure 2:
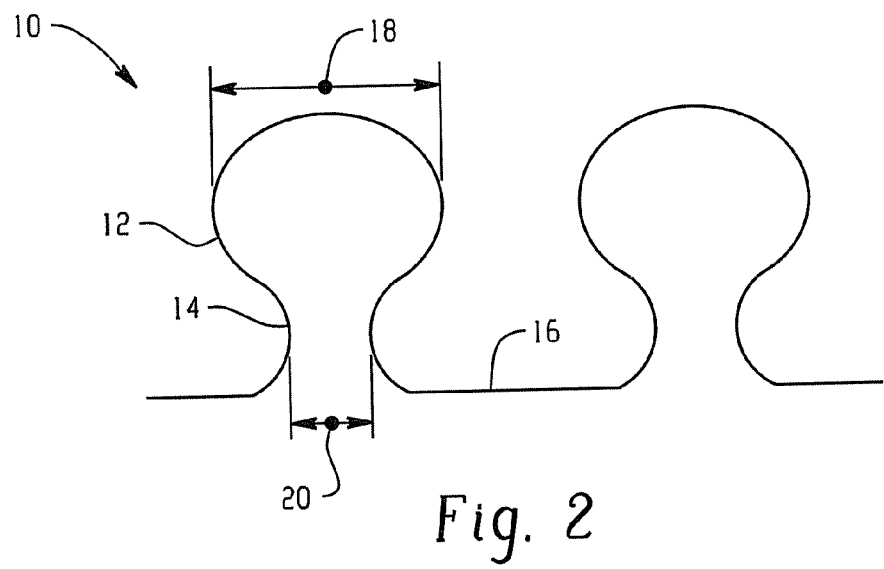
FIG. 2 is a front profile view of an embodiment of the protrusions.

FIGS. 1 and 2 illustrate embodiments of a protrusion 10. In both FIGS. 1 and 2, a first portion 12 is connected to a base 16 by a second portion 14. The first portion 12 comprises a first portion diameter 18 and the second portion 14 comprises a second portion diameter 20. As used herein, unless specifically specified otherwise, the diameters are the major diameter (i.e., the longest diameter) for the particular portion. The first portion 12 is within the protrusion 10, while the second portion 14 is adjacent an opening 15 between the base 16 and the second portion 14. In one embodiment, the second portion diameter 20 is less than or equal to 90% of the first portion diameter 18. In another embodiment, the second portion diameter 20 is less than or equal to 80% of the first portion diameter 18, specifically less than or equal to 70% of the first portion diameter 18, more specifically less than or equal to 60% of the first diameter portion 18; e.g., the second portion diameter 20 can be 25% to 75% of the first portion diameter 18, specifically the second portion diameter 20 can be 25% to 55% of the first portion diameter 18.

Referring now to FIGS. 4-8, various exemplary shapes capable for use as the protrusions described herein are illustrated. As can be seen from FIGS. 4-8, various polygonal and rounded shapes are possible where the second portion 24 geometry is less than the first portion 22 geometry. The protrusions comprise a first portion 22 and a second portion 24 with a symmetry plane 26 between the first portion 22 and the second portion 24 and a mirror symmetry plane 36 between adjacent protrusions. The first portion 22 comprises a first portion diameter 28 and the second portion 24 comprises a second portion diameter 30. The first portion 22 and the second portion 24 can be repeated across the width of the sheet with respect to the symmetry plane 26. The protrusions are repeated across the length and/or width of the sheet with respect to the symmetry plane 26 such that the geometry on one side of the mirror symmetry plane 36 is the same as that on the other side. As can be seen from FIGS. 1, 2, and 4-8, the sheet is designed such that cavities are formed (e.g., the protrusion forms a cavity) such that an opening into the cavity (e.g., the second portion 24) has an opening diameter (22) that is narrower than a body diameter (30) in the body of the cavity (e.g., first portion 22). For example, the second portion 24 can diverge to the first portion 22. Various geometries are possible wherein the opening to the cavity is smaller than a point within the cavity. These cavities repeat across a width of the sheet as is illustrated, with each cavity extending the length of the sheet.

Figure 3:
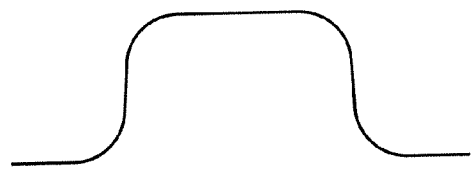
FIG. 3 is a front profile view of a corrugation in a sheet.
Figure 4:
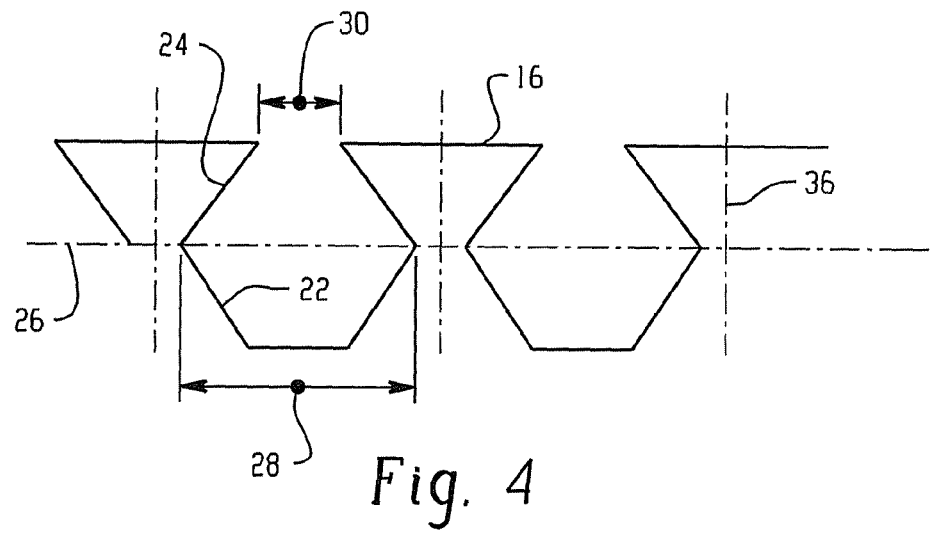
FIG. 4 is a front profile view of an embodiment of the protrusions.
Figure 5:
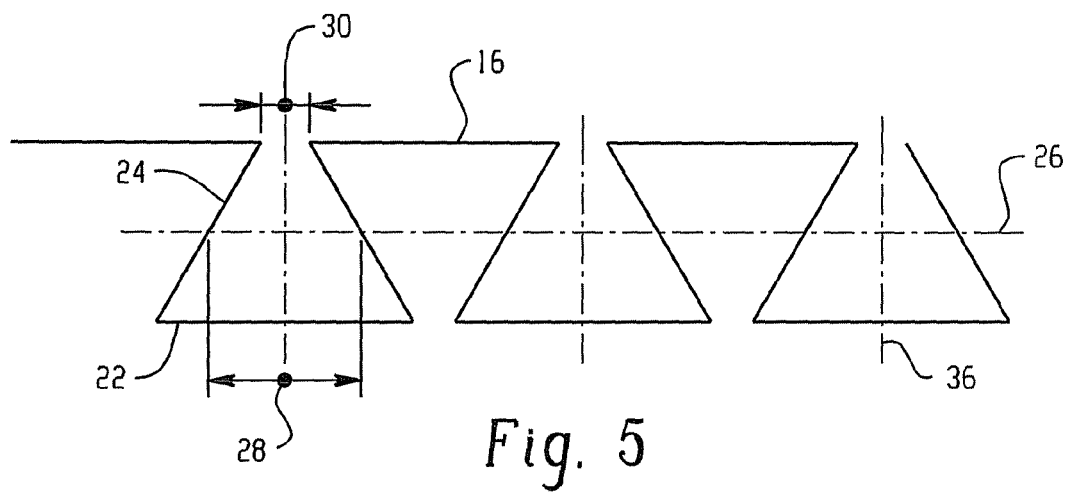
FIG. 5 is a front profile view of an embodiment of the protrusions.
Figure 6:
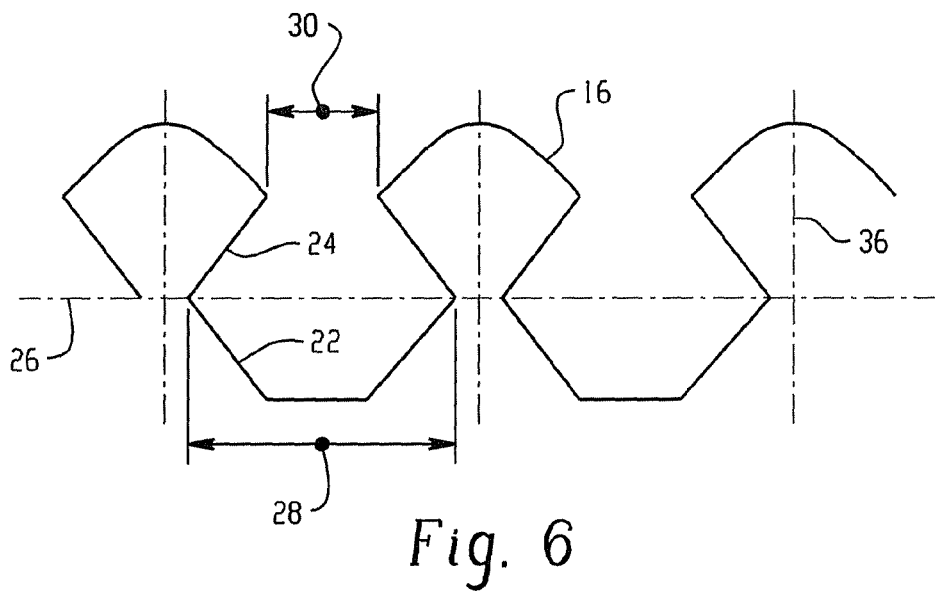
FIG. 6 is a front profile view of an embodiment of the protrusions.
Figure 7:
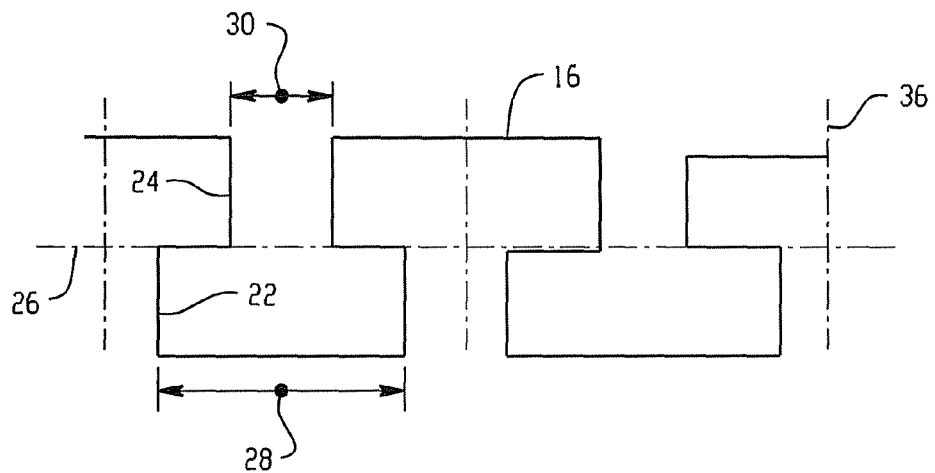
FIG. 7 is a front profile view of an embodiment of the protrusions.
Figure 8:
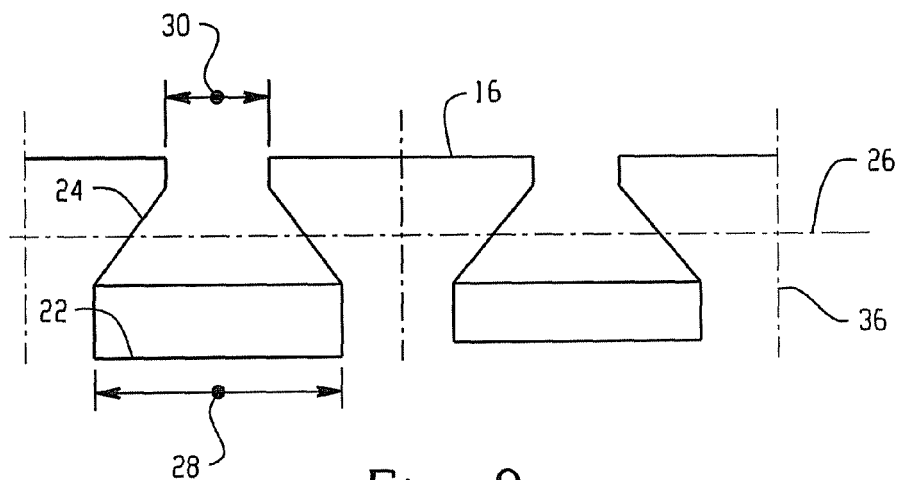
FIG. 8 is a front profile view of an embodiment of the protrusions.
Figure 9:
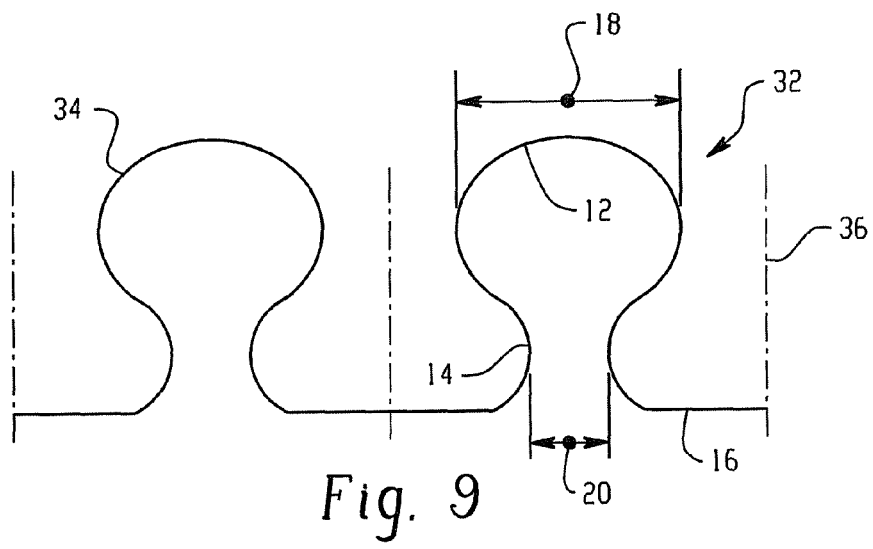
FIG. 9 is a front profile view of the embodiment of FIG. 2.
Figure 11:
FIG. 11 is a front profile view of a corrugation in a sheet.

FIG. 9 illustrates the embodiment of FIG. 2, where each protrusion 32 fills a unit cell 34. The unit cell 34 repeats across the length of the sheet to fill the sheet with protrusions. When a stress (e.g., wind) is applied to the sheet, the wind acts on the protrusions. It is to be noted that stress can be applied to the sheet in any direction. In one embodiment, the stress is applied to the first portion 12, 22 of the protrusion 10. In another embodiment, the stress is applied to the second portion 14, 24 of the protrusion 10. In yet another embodiment, the stress is applied to the first portion 12, 22 of the protrusion 10 and to the second portion 14, 24 of the protrusion 10. As the stress acts on the protrusions, the first portion 12, 22 of the protrusions deflects downward causing expansion of the first portion 12, 22 in the direction of the first portion diameter 18, 28. Simultaneously, the second portion 14, 24 of the protrusions deflects upward causing contraction of the first portion 12, 22 in the direction of the first portion diameter 18, 28. An overall change in the first portion diameter 18, 28 of a stressed protrusion 10 as compared to a non-stressed protrusion can be less than or equal to 10%, more specifically less than or equal to 5%. Instead of stiffening, the protrusions as shown in FIG. 3 flatten when a load is applied (e.g., see FIG. 11).

As the stress is acting on the protrusions, in one embodiment, the second portion diameter 20 is less than or equal to 90% of the first portion diameter 18, specifically less than or equal to 80% of the first portion diameter 18, more specifically less than or equal to 70% of the first portion diameter 18, and yet more specifically less than or equal to 60% of the first diameter portion 18; for example, the second portion diameter 20 can be 25% to 75% of the first portion diameter 18, specifically the second portion diameter 20 can be 25% to 55% of the first portion diameter 18.

When a wind load is applied, the protrusions become stiff and act as structural reinforcing members to the sheet. For a given thickness, stress is decreased by greater than or equal to 20%, specifically greater than or equal to 25%, more specifically, greater than or equal to 35%, still more specifically greater than or equal to 45%. Also for a given thickness, deflection is decreased by greater than or equal to 5%, specifically greater than or equal to 10%, more specifically greater than or equal to 25%, still more specifically greater than or equal to 50%, yet more specifically greater than or equal to 60%, more specifically still greater than or equal to 75%.

As illustrated in FIG. 1, the protrusions can be shaped such that the first portion 12 of the protrusion 10 is broader than the second portion 14. In one embodiment, the protrusions can be present on a portion of a sheet. In another embodiment, the protrusions can be present throughout the length of a sheet. In still another embodiment, the protrusions can be present on a portion of the sheet and present throughout the length and/or width of the sheet. In yet another embodiment, the protrusions can form a pattern and can be dispersed about the sheet across the width of the sheet.

The sheets disclosed herein can be processed via any polymer processing method, including, but not limited to extrusion or calendaring. Specifically, a single screw extruder can be employed to extrude a polymer melt (e.g., polycarbonate, such as Lexan®, commercially available from SABIC Innovative Plastics). The polymer melt is fed to a profile die capable of forming an extrudate having a cross-section. The sheet travels through a sizing apparatus (e.g., vacuum bath comprising sizing dies) and is then cooled below its glass transition temperature (e.g., for polycarbonate, about 297° F. (147° C.)).

After the panel has cooled, it can be cut to the desired length utilizing an extrusion cutter, such as an indexing in-line saw. Once cut, the sheet can be subjected to secondary operations before packaging. Exemplary secondary operations can comprise annealing, printing, attachment of fastening members, trimming, further assembly operations, and/or any other desirable processes. The size of the extruder, as measured by the diameter of the extruder's screw, is based upon the production rate desired and calculated from the volumetric production rate of the extruder and the cross-sectional area of the panel. The cooling apparatus can be sized (e.g., length) to remove heat from the extrudate in an expedious manner without imparting haze.

The size of the extruder, cooling capacity of the cooling apparatus, and cutting operation can be capable of producing the sheet at a rate of greater than or equal to about 5 feet per minute. However, production rates of greater than about 10 feet per minute, or even greater than about 15 feet per minute can be achieved if such rates are capable of producing surface features that comprise the desired attributes.

Coextrusion methods can also be employed for the production of the sheet. Coextrusion can be employed to supply different polymers to any portion of the sheet's geometry to improve and/or alter the performance of the sheet and/or to reduce raw material costs. In one embodiment, a coextrusion process can be employed to reduce raw material costs by supplying a less expensive polymer to non-structural sections (e.g., foamed or recycled materials). In another embodiment, a coextrusion process can be employed to apply a polymer comprising high light transmission (e.g., greater than or equal to about 80%) to the top surface and/or bottom surface. One skilled in the art would readily understand the versatility of the process and the myriad of applications in which coextrusion can be employed in the production of sheets.

Figure 10:
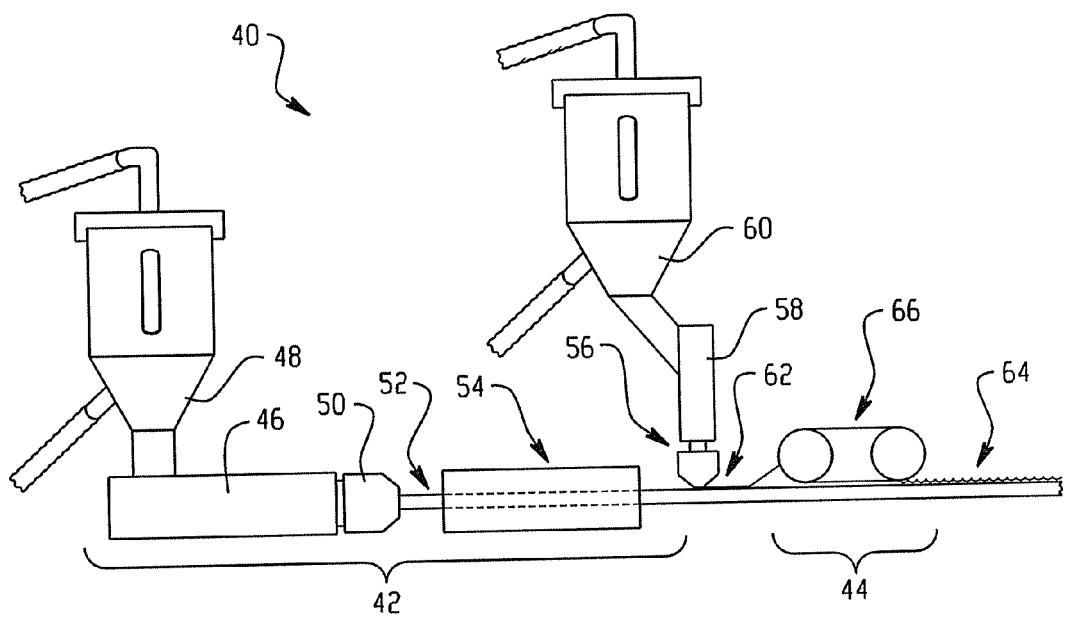
FIG. 10 is a side view of an embodiment of a sheet manufacturing line.

Referring now to FIG. 10, a side view of an embodiment of a sheet forming manufacturing line generally referred to as 40, is illustrated. In FIG. 10, the manufacturing line 40 comprises an extrusion process 42 and a protrusion forming process 44. The extrusion process 42 comprises a primary extruder 46 to which is supplied a polymer (not shown) from a hopper/dryer 48. The polymer is melted and conveyed through the extruder 48 and pushed through a profile die 50. The profile die 50 comprises a design that is capable of producing a corrugated sheet 52. The protruded sheet 52 is fed through a vacuum water bath 54 that is capable of sizing and cooling the corrugated sheet 52. The corrugated sheet 52 continues into the protrusion forming process 44, which comprises a hot melt coating die 56 that disposes a hot melt 62 onto the top surface of the protruded sheet 52. The hot melt coating die 56 is fed from a secondary extruder 58 that converts a second polymer (not shown) into the hot melt 62. The secondary extruder 58 is fed the second polymer by a second hopper/dryer 60. Once the hot melt 62 is disposed on the corrugated sheet 52, the hot melt 62 is formed into further protrusions 64 by an embossing belt 66. It is to be understood that the sheet forming manufacturing line 40 can comprise variations of the extrusion process 42 and the protrusion forming process 44 can comprise additional operations such as coating, forming, laminating, printing, labeling, annealing, cutting, trimming, assembling, and so forth, as well as combinations comprising at least one of the foregoing.

A method of making a sheet as disclosed herein can include various methods of forming the protrusions into a sheet, such as extruding a sheet and then using a calendaring process, cold bending method, and so forth, to form the protrusions into the sheet. Optionally, the corrugated sheet can be extruded through a die (profiled surface extrusion) to form the desired surface features directly from the extruder. Other methods of forming sheets can also be employed if they are capable of attaining the desired profile.

The following non-limiting examples further illustrate the various embodiments described herein.

EXAMPLES

Four samples are analyzed using finite element method (FEM) simulations utilizing Abacus® software for performance evaluation. Finite element modeling methodology is adopted for numerical evaluations. HyperMesh® and ABAQUS®, a pre-processing and finite element modeling and analysis software, respectively, are used to predict the sheet performance. The sheet is meshed with fully integrated general-purpose quadrilateral elements available in ABAQUS® (Abacus 2007). Appropriate mess convergence studies are performed before comparative numerical analysis and nonlinear elasto-plastic material models are used. Geometric nonlinear effects are also included in the analysis.

Comparative Samples A and B utilize non-stress stiffening protrusions as illustrated in FIG. 3, while Samples 1 and 2 utilize stress-stiffening protrusions as illustrated in FIG. 1.

The sheet thickness is varied between the samples to illustrate that lower deflection could be achieved with the sheets having the protrusions described herein with less starting material (i.e., a lower thickness and hence lower weight sheet could be used while still resulting in lower deflection compared to sheets with a higher thickness and without the protrusions described herein). Comparative Samples A and B flatten when a load is applied, rather than stiffen (see e.g., FIG. 11).

Table 1 provides the dimensions of each sample along with the external stress load used, while Table 2 provides the results of the analysis conducted. The length of the samples is 1890 millimeters (mm) and the width is 1444 mm, while the thickness varies from 1.30 mm to 2.36 mm. The crown height, or resting height of the protrusions (i.e., height before an external stress was applied), is 51 mm. The same load is used in each sample, 2489 Newtons per square meter (N/m$^2$). A load is applied to the sheet and deflection of the sheet is measured in Plane X, and Plane Y, and then total deflection of the sheet is measured. Total deflection is the deformation in the thickness direction. The inplane deflection (i.e, deflection in Plane X and Plane Y) are measured against the lateral deformation. The Z direction is the mid-sheet deflection, which is an important characteristic for performance requirements. If the deflection is too great, it can break the surface onto which the sheet is attached to (e.g., glass). Deflection in Plane X deflection evaluates pop out deformation, while deflection in Plane Y measures transverse deflection. Deflection in the middle of the sheet (deflection mid-sheet) is also measured. The load is applied to the protrusions. In addition to deflection, the Max Von Mises Stress is also measured and the Boundary Condition is constant. The stiffness measured in Newtons per meter (N/m) is calculated from the load and deflection mid sheet

TABLE 1

Sample Dimensions

| Sample # | Length (mm) | Width (mm) | Sheet Thickness (mm) | Crown Height (mm) | Load (N/m$^2$) |
|---|---|---|---|---|---|
| Comp. A | 1890 | 1444 | 2.36 | 51 | 2489 |
| Comp. B | 1890 | 1444 | 1.78 | 51 | 2489 |
| 1 | 1890 | 1444 | 1.78 | 51 | 2489 |
| 2 | 1890 | 1444 | 1.30 | 51 | 2489 |

TABLE 2

Analysis Results

| Sample # | Max. Deflection (mm) | | | Deflection Mid-Sheet (mm) | Max. Von Mises Stress | Boundary Condition | Stiffness (N/m) |
|---|---|---|---|---|---|---|---|
| | Plane X | Plane Y | Total | | | | |
| Comp. A | 23.25 | 1.961 | 63.79 | 33.13 | 118.5 | Bolted | 81,165 |
| Comp. B | 70.69 | 2.397 | 113.70 | 40.05 | 164.4 | Bolted | 62,147 |
| 1 | 6.908 | 1.789 | 46.09 | 28.92 | 90.94 | Bolted | 86,065 |
| 2 | 88.21 | 2.427 | 106.60 | 35.94 | 126.2 | Bolted | 69,254 |

As can be seen from Comparative Samples A and B, the total deflection increases by 78% when the sheet thickness decreases from 2.4 mm to 1.8 mm. When the stress-stiffening protrusions as described herein are utilized, however, for the same sheet thickness, the total deflection decreases by nearly 60% (see Comparative Sample B and Sample 1). When the sheet thickness decreases further to 1.3 mm (Sample 2), the total deflection still decreases as compared to Comparative Sample B, which has a thickness of 1.8 mm. In fact, the total deflection of Sample 2 still decreases by 6% as compared to Comparative Sample B, the thicker standard without the protrusions as described herein. In addition, Sample 1 at a thickness of 1.8 mm has 28% less total deflection than Comparative Sample A at 2.4 mm thick.

To obtain a total deflection of less than 100 mm, sample thicknesses greater than 2.0 mm are required for samples without the present stress-stiffening protrusions. Samples 1 and 2 illustrate that sheets with decreased thickness can be utilized, meaning overall less material and cost, with decreasing deflection by utilizing protrusions on the surface(s) of the sheet in the shapes disclosed herein.

As can also be seen from Comparative Samples A and B, the mid-sheet deflection increases by 38% when the sheet thickness decreases from 2.4 mm to 1.8 mm. When the stress-stiffening protrusions as described herein are utilized, however, for the same sheet thickness, the mid-sheet deflection decreases by 38% (see Comparative Sample B and Sample 1). When the sheet thickness decreases further to 1.3 mm (Sample 2), the mid-sheet deflection still decreases as compared to Comparative Sample B at a thickness of 1.8 mm. In fact, the mid-sheet deflection of Sample 2 still decreases by 11% as compared to Comparative Sample B. In addition, Sample 1 at a thickness of 1.8 mm has 15% less mid-sheet deflection than Comparative Sample A at 2.36 mm thick.

With the present protrusions, Applicants unexpectedly discovered a maximum deflection of less than or equal to 100 mm at a thickness of 1.8 mm can be achieved, specifically, a maximum deflection of less than or equal to 75 mm at a thickness of 1.8 mm, more specifically a deflection of less than or equal to 50 mm at a thickness of 1.8 mm.

To obtain a mid-sheet deflection of less than 35 mm, sample thicknesses greater than 2.0 mm are required for samples without the present stress-stiffening protrusions. By employing the stress-stiffening protrusions, a mid-sheet deflection (on a 1890 mm by 1444 mm sheet) of less than or equal to 45 mm, specifically less than or equal to 40 mm, more specifically less than or equal to 36 mm, can be attained with a sheet having a thickness of 1.3 mm. Similarly, with the stress-stiffening protrusions, a mid-sheet deflection (on a 1890 mm by 1444 mm sheet) of less than or equal to 35 mm, specifically less than or equal to 30 mm can be attained with a sheet having a thickness of 1.8 mm. This is an unexpected and marked improvement over Comparative Sample B at the same thickness, whose mid-sheet deflection is over 40 mm. Similarly at 1.3 mm Applicants still achieve a lower mid-sheet deflection than Comparative Sample B, a significantly thicker sample at 1.8 mm (thicker by almost 40% compared to Sample 2).

Table 2 demonstrates that the stiffness of the sheet is increased with the present stress-stiffening protrusions. When comparing Comparative Sample B with Sample 1, both having thicknesses of 1.8 mm, the stiffness of the sheet increased by over 20,000 N/m, an increase of 40%. At a thickness of 1.3 mm, the sheet can have a stiffness of greater than or equal to 62,000 N/m, specifically greater than or equal to 65,000 N/m, more specifically greater than or equal to 69,000 N/m. This is an unexpected improvement over Comparative Sample B, at 1.8 mm thick. At a thickness of 1.8 mm, Applicants unexpectedly found even greater stiffness with values greater than or equal to 70,000 N/m, specifically greater than or equal to 75,000 N/m, more specifically greater than or equal to 85,000 N/m. These values are significantly larger than those observed with Comparative Sample B at the same thickness (nearly 40% greater stiffness for Sample 1 versus Comparative Sample B) and even greater than Comparative Sample A, which is 33% thicker than Sample 1.

Table 2 also demonstrates that the stress levels in the sheet decrease by at least 20% in each sample with the protrusions as described in this application. The thickness of the sheet decreases from 2.36 mm to 1.78 mm between Comparative Samples A and B, while the stress increases between Comparative Samples A and B by 28%. When stress-stiffening protrusions are used on the sheets, the stress decreases by 45% when the same thickness sheets are used (Comparative Sample B and Sample 1 at a thickness of 1.78 mm). When the thickness decreases further still to 1.3 mm, the stress still decreases 23% as compared to Comparative Sample B (with a thickness of 1.78 mm). At a thickness of 1.3 mm, the sheet has a maximum Von Mises stress of less than or equal to 150, specifically less than or equal to 140, more specifically less than or equal to 130. At a thickness of 1.8 mm, the sheet has a maximum Von Mises stress of less than or equal to 100 specifically less than or equal to 100, more specifically less than or equal to 95. Samples 1 and 2 illustrate that sheets with decreased thickness can be utilized, while attaining equivalent and even improved results. This means overall less material and cost with decreased stress levels when utilizing stress-stiffening protrusions on the surface(s) of the sheet.

The resultant sheet can be used in numerous applications such as glazing applications, use as a window (e.g., train, building and construction, greenhouse, vehicle), doors (e.g., revolving, sliding), storm panel, roofing, wall panel, and so forth.

The terms "first," "second," and the like, "primary," "secondary," and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. As used herein, "combination" is inclusive of blends, mixtures, alloys, reaction products, and the like. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Unless defined otherwise, technical and scientific terms used herein have the same meaning as is commonly understood by one of skill in the art to which this application belongs. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sheet comprising:
   protrusions comprising a first portion extending from a base by a second portion, wherein a second portion diameter is less than a first portion diameter; and
   wherein the sheet stiffens when an external force is applied;
   wherein the sheet is transparent.

2. The sheet of claim 1, wherein the second portion diameter is less than or equal to 90% the first portion diameter.

3. The sheet of claim 2, wherein the second portion diameter is less than or equal to 80% of the first portion diameter.

4. The sheet of claim 3, wherein the second portion diameter is 25% to 75% of the first portion diameter.

5. The sheet of claim 4, wherein the second portion diameter is 25% to 55% of the first portion diameter.

6. The sheet of claim 1, wherein the sheet has a mid-sheet deflection at a thickness of 1.3 mm, length of 1890 mm, and width of 1444 mm of less than or equal to 45 mm.

7. The sheet of claim 6, wherein the sheet has a mid-sheet deflection of less than or equal to 40 mm.

8. The sheet of claim 1, wherein the sheet has a stiffness at a thickness of 1.8 mm, length of 1890 mm, and width of 1444 mm of greater than or equal to 70,000 N/m.

9. The sheet of claim 8, wherein the sheet has a stiffness of greater than or equal to 85,000 N/m.

10. The sheet of claim 1, wherein the sheet has a stiffness at a thickness of 1.3 mm, length of 1890 mm, and width of 1444 mm of greater than or equal to 62,000 N/m.

11. The sheet of claim 10, wherein the sheet has a stiffness of greater than or equal to 69,000 N/m.

12. The sheet of claim 1, wherein the sheet comprises polycarbonate.

13. An article comprising the sheet of claim 1, wherein the article is selected from the group consisting of a window, a storm panel, roofing, or a wall panel.

14. A sheet comprising:
   protrusions comprising a first portion extending from a base by a second portion, wherein a second portion diameter is less than a first portion diameter; and
   wherein the sheet stiffens when an external force is applied;
   wherein the sheet has a mid-sheet deflection at a thickness of 1.8 mm, length of 1890 mm, and width of 1444 mm of less than or equal to 35 mm.

15. The sheet of claim 14, wherein the sheet has a mid-sheet deflection of less than or equal to 30 mm.

16. The sheet of claim 14, wherein the sheet is configured for use in glazing applications.

17. A window comprising:
   a sheet comprising
   protrusions comprising a first portion extending from a base by a second portion,
   wherein a second portion diameter is less than a first portion diameter; and
   an optical coating.

* * * * *